Dec. 16, 1952 A. M. H. JONES 2,622,228
PLAN POSITION INDICATOR CIRCUITS
Filed Feb. 5, 1951
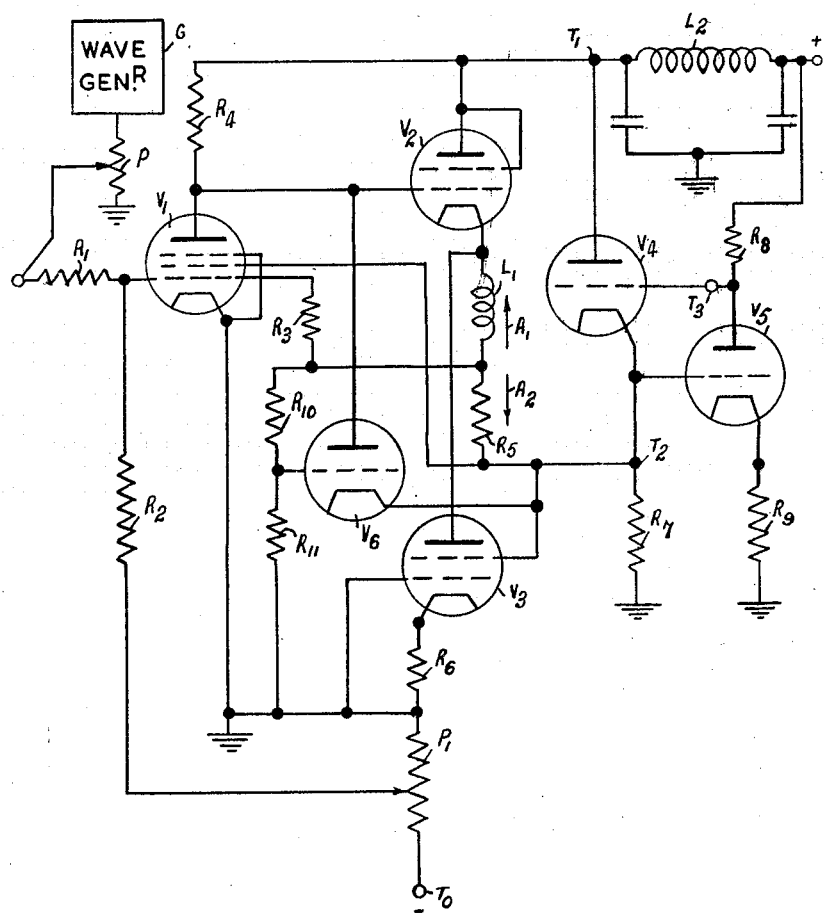
INVENTOR
Anthony M. H. Jones
By Ralph B. Stewart
attorney Patented Dec. 16, 1952

2,622,228

UNITED STATES PATENT OFFICE 2,622,228

PLAN POSITION INDICATOR CIRCUITS

Anthony Mervyn Harold Jones, London, England, assignor to A. C. Cossor Limited, London, England, a company of Great Britain Application February 5, 1951, Serial No. 209,362
In Great Britain February 14, 1950

4 Claims. (Cl. 315—27)

The present invention relates to plan position indicator circuits for radar.

In a plan position indicator a cathode ray beam is caused to execute recurrent sweeps over the screen of a cathode ray tube, in directions radially outward with respect to an origin, which may be but is not necessarily on the screen, and the direction of the sweep is varied in step with variations in the direction of emission of the radar pulse.

The condition in which the origin is at the centre of the screen is suitable when echoes from a region centred upon and extending outwards from the vicinity of the transmitter are to be displayed upon the screen but it is often required to offset the origin from the centre of the screen in order to enable other regions to be displayed. For example it may be required to display a region subtending an acute angle at the transmitter and extending between 20 and 30 miles from the transmitter and to disregard regions outside this angle and regions within the angle and nearer than 20 and greater than 30 miles from the transmitter.

It is often a further requirement to vary the scale of the display. Thus for instance in one setting a sweep from one side to the opposite side of the screen may represent 50 miles and in another setting it may be required that the same sweep shall represent 10 miles.

For the purpose of producing the required movements of the cathode ray beam it is common practice to provide two pairs of deflecting coils adapted to deflect the beam in mutually perpendicular directions and to pass through the pairs of coils currents of saw-tooth waveform modulated by sinusoidal oscillations of frequency linked to the rotary movement of the radar transmitting aerial, the oscillation modulating the current fed to one pair of coils being in phase quadrature with respect to that modulating the current fed to the other pair of coils. The saw-tooth waveform comprises a substantially linear working stroke followed by a rapid fly-back or return stroke, the working stroke being arranged to commence substantially at the instant of transmission of each pulse.

In order to generate a current of the desired waveform a suitable voltage is usually applied to the grid circuit of a valve and the coil is arranged in the anode circuit. For the purpose of varying the scale it is only necessary to vary the amplitude of the saw-tooth current, and hence the slope of the working stroke, and this can be done by correspondingly varying the amplitude of the voltage applied to the grid of the valve. Thus with the origin, representing the position of the transmitter, located at the centre of the screen, if a working stroke sufficient to deflect the beam from the centre to the edge of the screen (that is through a distance equal to the radius $r$ of the screen) lasts for a time representing a distance of 50 miles, a saw-tooth having twice the amplitude (and hence twice the length of working stroke) will deflect the beam from the centre to the edge of the screen in half the previously mentioned time and the distance $r$ will represent 25 miles. It will be observed that when the saw-tooth of double amplitude is used only half of its amplitude is employed in deflecting the beam over the screen, the remainder being ineffective.

If it is desired to represent on the screen a region of approximately square shape having one corner at the transmitter, and therefore constituting the origin of the sweep, it is necessary to offset the origin by deflecting the beam to a rest position at or near the edge of the screen. In some cases it may be desired to represent a region spaced by a distance which is several times $r$ from the centre of the screen, in which case the origin must be displaced by this distance. In order to make full use of the screen area, whenever the origin is displaced from the centre of the screen, the scale may be correspondingly increased, in the manner already described.

For the purpose of offsetting the origin it has been proposed to provide auxiliary deflecting coils separate from the main deflecting coils, which are traversed by the saw-tooth currents, and to pass suitable direct currents through these coils. In some cases bifilar windings have been used, one half of each winding constituting the main deflecting coil and the other half constituting the auxiliary deflecting coil. These arrangements are relatively complicated and substantially increase the cost of the apparatus.

Another proposal has been to use a push-pull circuit to feed each pair of deflecting coils, the coils being connected between the anodes of the valves and their junction being connected to the positive terminal of a high tension source. Suitable alternating voltages are applied in push-pull to the grids of the valves. In order to offset the beam, the standing bias voltages on the two grids are varied in inverse senses, thus decreasing the direct current in one coil of each pair and increasing that in the other. This arrangement suffers from the disadvantage that in practical constructions the two coils of each pair are not closely coupled magnetically and that pero offset is produced by equal and opposite currents in the two coils. Because of the poor coupling a distorted magnetic field is produced instead of zero field when the offset is zero.

If the rest position of the beam is always at the origin, when a considerable offset of the origin is required it is necessary to apply relatively large biasing deflection to the beam, for instance by passing relatively large currents through auxiliary deflecting coils, to hold the beam normally at the origin and the alternating deflecting currents must be correspondingly large, since in order to deflect the beam from the origin to the centre of the screen the saw-tooth currents must equal the direct currents respectively. In order to avoid this disadvantage, it has been proposed to arrange that even with large amounts of offset of the origin the rest position of the beam is at or near to the edge of the screen, so that the direct deflecting current need only be small. This can be done by employing an amplitude gating device which permits the application to the grid of each of the valves having a pair of main deflecting coils in its anode circuit only a predetermined charge $v$ of voltage, this charge corresponding to a current in the coils sufficient to deflect the beam through a diameter of the screen, namely $2r$. The effect of the gating device is then to pick out from the waveform applied thereto a slice of width $v$. The distance to which this voltage $v$ corresponds depends, of course, upon the scale of the presentation as determined by the slope and amplitude and the oscillation applied to the gating device. By varying the direct component of the alternating voltage applied to the grid of the valve, the position of the slice in relation to the starting point of the saw-tooth wave can be adjusted. The beam is offset to a suitable point on or near the edge of the screen by passing appropriate currents through the auxiliary coils. The resulting currents in the main deflecting coils are of truncated saw-tooth waveform.

The operation will be made clearer by a numerical example in which some assumptions will be made for the sake of simplicity. Thus only the maximum positive and negative values of the saw-tooth currents due to modulation will be considered and it will be assumed that the same current is always applied to both pairs of coils so that only the current in one pair need be discussed. It will be assumed that a change in grid voltage of one unit serves to produce in the coils a change of current sufficient to deflect the beam a distance $r$ and that the gating device will pass a total maximum voltage sweep of 2 units. What will be called zero grid voltage corresponds to zero current in the coils. The auxiliary coils will be assumed to have the same sensitivity as the main coils.

With no current in the auxiliary coils the origin is in the centre of the screen and a sweep voltage of one unit on the grid will then sweep a distance $r$ which may represent say 50 miles around the transmitter. If it is desired to increase the scale say five times so that $r$ now represents ten miles in the immediate vicinity of the transmitter, it is only necessary to increase the amplitude of the sweep voltage to five units of which only that part from $-1$ to $+1$ unit is allowed by the gating device to be effective. If now it is desired to display to the same scale 20 miles extending from the transmitter within a given acute angle in azimuth, the current in the auxiliary coils is made 1 unit in the appropriate sense so that the beam is deflected to an appropriate point on the edge of the screen and one unit of direct bias in the appropriate sense is applied to the input of the gating device. The origin is then as before coincident with the rest position of the beam and the gating device permits that part of the sweep voltage between 0 and 2 units to pass thus causing a sweep of the beam of $2r$. Finally if it is desired to display to the same scale a region between 30 and 50 miles from the transmitter, the origin is offset from the edge of the screen by an amount corresponding to 30 miles by increasing the bias at the input to the gating device to 4 units in the appropriate sense. The current in the auxiliary coils is unaltered so that the rest position of the beam is still at the edge of the screen. The gating device now ensures that only that part of the input thereto between 3 and 5 units is effective.

The present invention has for its principal object to provide an improved circuit for a plan position indicator which employs the same deflecting coils for sweep deflection and for offsetting of the origin, which enables the condition of no displacement of the origin to be produced with zero current in each pair of deflecting coils, and which is of simple construction.

It is highly desirable to keep to a minimum the amplitude of saw-tooth current fed to deflecting coils because the generation of large saw-tooth currents without distortion presents difficulties and is costly in equipment. A further object of the invention is, therefore, to provide an improved and simple circuit for a plan position indicator which employs the same deflecting coils for sweep deflection and for offsetting the origin, and in which the origin can be offset by several radii of the screen without the need to generate deflecting currents substantially in excess of that needed to produce deflection of the beam over the screen.

According to the present invention a circuit for feeding a deflecting coil of a plan position indicator comprises two electron discharge valves having their anodes connected to the positive terminal of a source of current, the deflecting coil being connected between the cathodes of the valves, the cathode of one of the valves being connected through a resistive device to a negative terminal of the source and the cathode of the other of the valves being connected to a terminal at a potential intermediate the potentials of the positive and negative terminals, means for applying an alternating voltage to vary the current through the two valves in inverse senses in order to drive a current of saw-tooth, or truncated saw-tooth, waveform through the coil, and means for varying the effective resistance of the two valves in inverse senses for the purpose of varying the magnitude and sense of the direct current in the coil.

The said resistive device is preferably a further valve arranged to pass a substantially constant current independently of the potential difference between its anode and cathode over a substantial range of such potentials.

In a preferred arrangement the alternating voltage is applied to the control grid of only that one of the said two valves whose cathode is connected to the resistive device and means are provided to limit the voltage swing of the grid of the said one of the two valves which is effective in varying the current in the valve. The other of the two valves may be so arranged that its effective resistance varies automatically in the opposite sense to that of the first of the two valves.

The invention will be described by way of example with reference to the accompanying drawing which is a circuit diagram of one embodiment of the invention.

An input voltage of waveform suitable to drive a linear saw-tooth current through a deflecting coil $L_1$ is generated in a wave generator G and applied through a potential divider P and a resistor $R_1$ to the control grid of a valve $V_1$, the cathode of which is earthed. The control grid is also connected through a resistor $R_2$ to a variable tapping on a potential divider $P_1$ having one end earthed and the end connected to a terminal $T_0$ maintained at a suitable negative potential relatively to earth.

The anode of the valve $V_1$ is connected through a resistor $R_4$ to a terminal $T_1$ maintained at a positive potential to earth and directly to the control grid of a valve $V_2$. The cathode of $V_2$ is connected to earth through the anode-cathode path of a valve $V_3$ arranged as a constant current-carrying device by the provision of a suitable resistor $R_6$ in its cathode lead and by connection of the control grid to earth. The anode and screen grid of $V_2$ are connected directly to $T_1$.

The cathode of $V_2$ is connected through the deflecting coil $L_1$ and a resistor $R_5$ in series to the screen grid of the valve $V_1$ and to the cathode of a valve $V_4$ and through a further resistor $R_7$ to earth. The anode of $V_4$ is connected directly to $T_1$. The junction of the coil $L_1$ and resistor $R_5$ is connected to the control grid of the valve $V_1$ through a resistor $R_3$ and the voltage drop across $R_5$ is arranged to apply a large negative feed-back to the valve $V_1$, this feed-back being proportional to the current in the coil $L_1$.

In describing the operation of the part of the circuit so far described, it will at first be assumed that the valve $V_1$ is operated over a linear part of its characteristic, that the potential at $T_1$ is maintained constant and that potentials of suitable value are applied (by means to be described later) to a terminal $T_3$ and thus to the control grid of $V_4$ to maintain terminal $T_2$ at a constant potential and hence to maintain a constant current in $R_7$. Considering only direct current conditions and assuming no alternating potential applied to the grid of $V_1$ the potential divider $P_1$ can be so adjusted that the valve $V_1$ carries maximum current and that the negative voltage on the control grid of $V_2$ is then sufficient to cut this valve off. Conditions may then be such that 270 milliamps. is drawn through a smoothing circuit including a choke $L_2$ connected to $T_1$, the current taken by the valve $V_1$ being assumed to be negligible. Since valve $V_2$ is cut off this current all flows through $V_4$ and it will be assumed that the valve $V_3$ is adapted to pass a constant current of 70 milliamps. so that 200 milliamps. flows through $R_7$ and 70 milliamps. flows in the direction of the arrow $A_1$ through $R_5$ and $L_1$.

Now let the potential divider $P_1$ be adjusted to reduce the current in $V_1$ and hence reduce the negative bias on $V_2$ until $V_2$ passes 70 milliamps. The whole of the current for $V_3$, namely 70 milliamps., passes through $V_2$ and the whole of the current for $R_7$, namely 200 milliamps., passes through $V_4$. The current in $L_1$ is therefore zero and corresponds to zero offset of the beam.

If the potential divider $P_1$ is further adjusted until the valve $V_2$ passes 140 milliamps., the 70 milliamps. required by $V_3$ leaves 70 milliamps. to flow in the direction of arrow $A_2$ through $L_1$, the current of 200 milliamps. through $R_7$ being made up of 70 milliamps. from the coil $L_1$ and 130 milliamps. from the valve $V_4$.

It is seen that by adjustment of the potential divider $P_1$ it is possible to vary the direct current in the coil $L_1$ from 70 milliamps. in one sense, through zero to 70 milliamps. in the opposite sense. It can be arranged that a current of 70 milliamps. is sufficient to deflect the beam from the centre of the screen to, or a little beyond, the edge of the screen. It is to be observed that throughout these adjustments the current drawn from the supply through $L_2$ remains constant.

In order to maintain a nearly constant potential at $T_2$ the valve $V_4$ may be operated in known manner as follows. The voltage across the resistor $R_7$ is applied to the control grid of an amplifier valve $V_5$ having anode and cathode load resistors $R_8$ and $R_9$ and the anode of the valve is connected to $T_3$. Any slight variation in potential of $T_2$ is then amplified and applied in reversed sense to $T_3$. The result is that the effective resistance of $V_4$ is varied automatically in such a manner that the potential at $T_2$ remains nearly constant.

The resistor $R_7$ is conveniently constituted wholly or in part by other parts of the display equipment.

In order to generate a saw-tooth current in the coil $L_1$ an input voltage of suitable waveform is applied from the generator G through $R_1$ to the control grid of $V_1$. If the potential divider $P_1$ is adjusted for zero direct current in the coil $L_1$, and if the input voltage has a suitable amplitude, the beam of the cathode ray tube will sweep from the centre of the screen over a distance approximately equal to $r$. By adjusting the potential divider $P_1$ until a current of 70 milliamps. in appropriate sense flows in the coil $L_1$ the beam is deflected to the neighbourhood of the edge of the screen.

The potentiometer P is provided to enable the scale of the presentation to be adjusted by adjusting the amplitude of the input voltage applied through $R_1$. The apparatus may be made capable of permitting large amounts of offset of the origin without the need to generate large deflecting currents in the following way. It has already been stated that when the potential divider $P_1$ is so adjusted that 70 milliamps. flows in the coil $L_1$ in the direction $A_1$, the valve $V_2$ is cut off. It is also arranged that when the potential divider $P_1$ is adjusted so that 70 milliamps. flows in $L_1$ in the direction $A_2$, the voltage on the control grid of valve $V_1$ is sufficient to cut this valve off. The result is that whatever voltages are applied through $R_1$ the maximum current that can flow in $L_1$ is $\pm 70$ milliamps. corresponding to a deflection of the beam from the centre to two diametrically opposite points near the edge of the screen or from one edge of the screen to the other. If the amplitude of the input voltage is increased beyond the minimum need for such deflection, the scale is increased but the above stated maximum deflection is not exceeded. The potential divider $P_1$ may be adjusted far beyond values corresponding to $\pm 70$ milliamps. in the coil $L_1$ and the effect of this is to apply a corresponding bias to the input voltage and so move the origin several radii $r$ beyond the edge of the screen.

The valves $V_1$ and $V_2$ in this example act as the gating device previously mentioned but if preferred these valves can be arranged to operate on linear parts of their characteristics and other means such for example as diodes may be provided to constitute the gating devices.

In one example the valve $V_1$ is of the type known as EF.50 and is arranged as a high gain pentode. The valve $V_2$ is a low impedance triode, tetrode or pentode and may be of the type known as CV.345. Valve $V_3$ is a tetrode or pentode and may also be a CV.345.

The resistors $R_1$, $R_2$ and $R_3$ may be wire-wound resistors of 100,000 ohms, resistor $R_6$ may be of 250 ohms. Terminal $T_1$ may be maintained at 500 volts positive and terminal $T_0$ at 300 volts negative with respect to earth. Terminal $T_2$ may be at about 250 volts positive with respect to earth.

In the normal application of the invention two circuits such as are shown in the drawing are used, one associated with one pair of deflecting coils and the other associated with the other pair of deflecting coils. The input voltage applied to one of the circuits is modulated in accordance with the sine of the angle made by the radar antenna with some datum direction and the other input voltage is modulated in accordance with the cosine of this angle. Offsetting of the origin to any desired position within the limits set by the gating device can then be effected by appropriate adjustment of the two potential dividers $P_1$.

As already stated the resistor $R_7$ may be constituted wholly or in part by other parts of the equipment. It may be common to the two deflecting circuits which provide currents for the two deflecting coils of the equipment.

It may be found that the maximum current flowing through $L_1$ and $R_5$ in the direction $A_2$ considerably exceeds the current required for a deflection $r$, in the present example 70 milliamps., and with the circuit so far described this maximum current is dependent upon the value of the voltage on the anode of $V_2$, on the impedance of $V_2$ and on other factors. The maximum current values for the two axes of deflection taken together may be in excess of the current required in the load $R_7$ and will then result in an undesirable rise in the voltage at $T_2$.

In order to avoid this difficulty there may be provided, as shown, a current limiting circuit including a valve $V_6$ and resistors $R_{10}$ and $R_{11}$. These two resistors constitute a potential divider and their values are so chosen that a negative bias is applied to the grid of $V_6$ sufficient to cut off this valve excepting when the potential at the junction of $L_1$ and $R_5$ reaches a positive value corresponding to a current of 70 milliamps. in $L_1$ in the direction $A_2$. When this potential is exceeded $V_6$ conducts and reduces the grid potential applied to $V_2$. It will be noted that when the valve $V_6$ conducts there is brought into operation a subsidiary feed-back loop which serves to limit the current through $L_1$ and $R_5$ in the direction $A_2$.

In this example $R_{10}$ and $R_{11}$ are of 39 and 330 K ohms respectively and both are high stability carbon resistors.

Many modifications may be made in the circuit described within the scope of the invention. Thus, for instance, voltages from the anode of valve $V_1$ may be applied to the control grids of both valves $V_2$ and $V_4$, that applied to $V_4$ being in opposite sign and phase to that applied to $V_2$.

Although it is preferred that the cathode load of the valve $V_2$ should be a constant current device, and this has certain advantages, it is not essential. The valve $V_3$ may be replaced by a resistor or by an element having both inductance and resistance. Alternatively the valve $V_3$ may constitute a part or the whole of this resistance and may have a choke associated therewith.

In a further modification of the arrangement shown in the drawing, voltages from the anode of the valve $V_1$ are applied to the control grids of both valves $V_2$ and $V_3$, those applied to $V_3$ being in opposite sign and phase to those applied to $V_2$. The maximum current required to flow through the valve $V_2$ is then approximately half that required in the arrangement shown in the drawing. The current drawn from the supply is, however, not constant.

I claim:

1. A circuit for feeding a deflecting coil of a plan position indicator comprising a first and a second electron discharge valve, each valve including an anode, a cathode and a control electrode, a source of direct current, a generator of alternating potential of waveform adapted to drive a current of at least partially saw-tooth waveform through said deflecting coil, connections between the anodes of said valves and the positive terminals of said source, means connecting said coil between the cathodes of said valves, a resistive device connected between the cathode of said first valve and a negative terminal of said source, a connection between the cathode of said second valve and a point at a potential intermediate between those of said positive and negative terminals, means to apply said alternating potential to drive alternating currents of opposite phase through said valves and thereby to produce an alternating current in said coil and means to vary the effective resistances of said two valves in inverse senses in order to vary the magnitude and sense of the direct current in said coil.

2. A circuit according to claim 1, wherein said resistive device is a third valve connected to pass a substantially constant current independently of the potential difference between its anode and cathode over a substantial range of such potentials.

3. A circuit for feeding a deflecting coil of a plan position indicator comprising a first and second electron discharge valve, each valve including an anode, a cathode and a control electrode, a source of direct current, a generator of alternating potential of waveform adapted to drive a current of at least partially saw-tooth waveform through said deflecting coil, connections between the anodes of said valves and the positive terminals of said source, means connecting said coil between the cathodes of said valves, a resistive device connected between the cathode of said first valve and a negative terminal of said source, a connection between the cathode of said second valve and a point at a potential intermediate between those of said positive and negative terminals, means to apply said alternating potential to a control electrode of said first valve to produce an alternating current in said first valve, means to generate in said second valve automatically an alternating current of opposite phase to that in said first valve, and means to vary the effective resistances of said two valves in inverse senses in order to vary the magnitude and sense of the direct current in said coil.

4. A circuit according to claim 1, comprising means to apply said alternating potential to a control electrode of said first valve and means to limit the voltage swing of said control electrode.

ANTHONY MERVYN HAROLD JONES.

REFERENCES CITED

The following references are of record in the file of this patent:

UNITED STATES PATENTS

| Number | Name | Date |
|---|---|---|
| 2,007,380 | Morlock | July 9, 1935 |
| 2,098,390 | Iams | Nov. 9, 1937 |
| 2,436,447 | Packard | Feb. 24, 1948 |
| 2,439,313 | Meagher | Apr. 6, 1948 |
| 2,466,784 | Schade | Apr. 12, 1949 |
| 2,553,360 | Court | May 15, 1951 |
| 2,565,392 | Neuwirth | Aug. 21, 1951 |